United States Patent
Yang

(10) Patent No.: US 9,385,596 B1
(45) Date of Patent: Jul. 5, 2016

(54) CHARGE PUMP CIRCUIT CAPABLE OF REDUCING REVERSE CURRENTS

(71) Applicant: eMemory Technology Inc., Hsin-Chu (TW)

(72) Inventor: Cheng-Te Yang, Taichung (TW)

(73) Assignee: eMemory Technology Inc., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 14/987,775

(22) Filed: Jan. 5, 2016

Related U.S. Application Data

(60) Provisional application No. 62/100,485, filed on Jan. 7, 2015.

(51) Int. Cl.
| | |
|---|---|
| G05F 1/10 | (2006.01) |
| H02M 3/07 | (2006.01) |
| H03K 3/012 | (2006.01) |
| H03K 5/159 | (2006.01) |
| H03K 17/687 | (2006.01) |
| H03K 5/00 | (2006.01) |

(52) U.S. Cl.
CPC ............. *H02M 3/07* (2013.01); *H03K 3/012* (2013.01); *H03K 5/159* (2013.01); *H03K 17/687* (2013.01); *H03K 2005/00019* (2013.01)

(58) Field of Classification Search
CPC ......... H02M 3/073; H02M 3/07; G11C 5/145
USPC .............................. 327/536, 333; 363/59, 60
See application file for complete search history.

(56) References Cited

U.S. PATENT DOCUMENTS

| | | | |
|---|---|---|---|
| 5,291,446 A | 3/1994 | Van Buskirk | |
| 5,692,164 A * | 11/1997 | Pantelakis | H02M 3/073 327/296 |
| 6,100,752 A | 8/2000 | Lee | |
| 6,995,603 B2 | 2/2006 | Chen | |
| 7,208,996 B2 | 4/2007 | Suzuki | |
| 7,649,957 B2 | 1/2010 | Garrity | |
| 8,274,322 B2 | 9/2012 | chang | |
| 8,710,909 B2 | 4/2014 | Kalluru | |
| 2005/0146375 A1* | 7/2005 | Ker | H02M 3/073 327/536 |
| 2008/0157854 A1* | 7/2008 | Al-Shamma | H02M 3/073 327/536 |
| 2013/0293284 A1* | 11/2013 | Drost | H02M 3/073 327/536 |
| 2014/0022007 A1* | 1/2014 | Sheng | G05F 3/02 327/536 |

* cited by examiner

*Primary Examiner* — Lincoln Donovan
*Assistant Examiner* — Thomas Skibinski
(74) *Attorney, Agent, or Firm* — Winston Hsu; Scott Margo

(57) ABSTRACT

A charge pump unit capable of reducing reverse current includes a first NMOS transistor, a first PMOS transistor, a second NMOS transistor, and a second PMOS transistor. The first NMOS transistor and the first PMOS transistor are coupled in series and are controlled by a first clock signal. The second NMOS transistor and the second PMOS transistor are coupled in series and are controlled by a second clock signal. The first NMOS transistor is for receiving a first input voltage and the second NMOS transistor is for receiving a second input voltage. The first clock signal and the second clock signal transit at different time points. A rising edge of the first clock signal leads a respective falling edge of the second clock signal.

11 Claims, 9 Drawing Sheets

CHARGE PUMP CIRCUIT CAPABLE OF REDUCING REVERSE CURRENTS

CROSS REFERENCE TO RELATED APPLICATIONS

This non-provisional application claims priority of U.S. provisional application U.S. 62/100,485, filed on Jan. 7, 2015, included herein by reference in its entirety.

BACKGROUND OF THE INVENTION

1. Field of the Invention

This invention relates to a charge pump circuit, and more particularly, a charge pump circuit that is capable of reducing reverse currents.

2. Description of the Prior Art

Due to requirements of low power for electronic devices, the power specification of integrated circuits (IC) is re-designed to work in a low voltage environment for reducing power consumption. For example, the IC power specification that used to be 5V before is now reduced to 3.3V or even lower than 2V. Although lower voltages are supplied to reduce power consumption, greater voltages are still needed in some situations. For example, flash memory may require a greater voltage for programming or erasing. The greater voltage is usually supplied by a charge pump circuit.

The charge pump circuits of the prior art are usually controlled by complementary clock signals. However, since the clock signals are not perfect square waves, switches of the charge pump circuits may be turned on or turned off unpredictably during transitions of voltage levels of the clock signals. In this case, unwanted reverse currents may be produced, which further increase power consumption. Therefore, how to reduce the reverse current of the charge pump circuit has become an issue to be resolved.

SUMMARY OF THE INVENTION

One embodiment of the present invention discloses a charge pump unit. The charge pump unit includes a first capacitor, a second capacitor, a first N-type metal oxide semiconductor (NMOS) transistor, a second NMOS, a first P-type metal oxide semiconductor (PMOS) transistor, and a second PMOS transistor. The first capacitor has a first terminal and a second terminal. The first terminal of the first capacitor is for receiving a first clock signal. The second capacitor has a first terminal and a second terminal. The first terminal of the second capacitor is for receiving a second clock signal.

The first NMOS transistor has a first terminal, a second terminal and a control terminal. The first terminal of the first NMOS transistor is for receiving a first input voltage, the second terminal of the first NMOS transistor is coupled to the second terminal of the first capacitor, and the control terminal of the first NMOS transistor is coupled to the second terminal of the second capacitor. The first PMOS transistor has a first terminal, a second terminal, and a control terminal. The first terminal of first PMOS transistor is coupled to the second terminal of the first NMOS transistor, the second terminal of the first PMOS transistor is for outputting a first output voltage, and the control terminal of the first PMOS transistor is coupled to the control terminal of the first NMOS transistor. The second NMOS transistor has a first terminal, a second terminal, and a control terminal. The first terminal second NMOS transistor is for receiving a second input voltage, the second terminal of the second NMOS transistor is coupled to the second terminal of the second capacitor, and the control terminal of the second NMOS transistor is coupled to the second terminal of the first capacitor. The second PMOS transistor has a first terminal, a second terminal, and a control terminal. The first terminal of the second PMOS transistor is coupled to the second terminal of the second NMOS transistor, the second terminal of the second PMOS transistor is for outputting a second output voltage, and the control terminal of the second PMOS transistor is coupled to the control terminal of the second NMOS transistor.

In addition, the first clock signal and the second clock signal transit at different time points. A rising edge of the first clock signal leads a respective falling edge of the second clock signal.

Another embodiment of the present invention discloses a charge pump circuit. The charge pump circuit includes a first charge pump unit and a second charge pump unit. The first charge pump unit includes a first capacitor, a second capacitor, a first N-type metal oxide semiconductor (NMOS) transistor, a second NMOS, a first P-type metal oxide semiconductor (PMOS) transistor, and a second PMOS transistor.

The first capacitor has a first terminal and a second terminal. The first terminal of the first capacitor is for receiving a first clock signal. The second capacitor has a first terminal and a second terminal. The first terminal of the second capacitor is for receiving a second clock signal.

The first NMOS transistor has a first terminal, a second terminal and a control terminal. The first terminal of the first NMOS transistor is for receiving a first input voltage, the second terminal of the first NMOS transistor is coupled to the second terminal of the first capacitor, and the control terminal of the first NMOS transistor is coupled to the second terminal of the second capacitor. The first PMOS transistor has a first terminal, a second terminal, and a control terminal. The first terminal of first PMOS transistor is coupled to the second terminal of the first NMOS transistor, the second terminal of the first PMOS transistor is for outputting a first output voltage, and the control terminal of the first PMOS transistor is coupled to the control terminal of the first NMOS transistor. The second NMOS transistor has a first terminal, a second terminal, and a control terminal. The first terminal second NMOS transistor is for receiving a second input voltage, the second terminal of the second NMOS transistor is coupled to the second terminal of the second capacitor, and the control terminal of the second NMOS transistor is coupled to the second terminal of the first capacitor. The second PMOS transistor has a first terminal, a second terminal, and a control terminal. The first terminal of the second PMOS transistor is coupled to the second terminal of the second NMOS transistor, the second terminal of the second PMOS transistor is for outputting a second output voltage, and the control terminal of the second PMOS transistor is coupled to the control terminal of the second NMOS transistor.

The second charge pump unit includes a third capacitor, a fourth capacitor, a third NMOS transistor, a fourth NMOS, a third PMOS transistor, and a fourth PMOS transistor.

The third capacitor has a first terminal and a second terminal. The first terminal of the third capacitor is for receiving a third clock signal. The fourth capacitor has a first terminal and a second terminal. The first terminal of the fourth capacitor is for receiving a fourth clock signal.

The third NMOS transistor has a first terminal, a second terminal, and a control terminal. The first terminal of the third NMOS transistor is coupled to the second terminal of the first PMOS transistor, the second terminal of the third NMOS transistor is coupled to the second terminal of the third capacitor, and the control terminal of the third NMOS transistor is coupled to the second terminal of the fourth capacitor. The third PMOS transistor has a first terminal, a second terminal, and a control terminal. The first terminal of the third PMOS is coupled to the second terminal of the third NMOS transistor, and the control terminal of the third PMOS is coupled to the control terminal of the third NMOS transistor. The fourth NMOS transistor has a first terminal, a second terminal, and a control terminal. The first terminal of the fourth NMOS transistor is coupled to the second terminal of the second PMOS transistor, the second terminal of the fourth NMOS transistor is coupled to the second terminal of the fourth capacitor, and the control terminal of the fourth NMOS transistor is coupled to the second terminal of the third capacitor. The fourth PMOS transistor has a first terminal, a second terminal, and a control terminal. The first terminal of the fourth PMOS transistor is coupled to the second terminal of the fourth NMOS transistor, and the control terminal of the fourth PMOS transistor is coupled to the control terminal of the fourth NMOS transistor.

In addition, the first clock signal, the second clock signal, the third clock signal and the fourth clock signal transit at different time points. A falling edge of the second clock signal lags a respective rising edge of the first clock signal and leads a respective rising edge of the fourth clock signal. The rising edge of the fourth clock signal leads a respective falling edge of the third clock signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
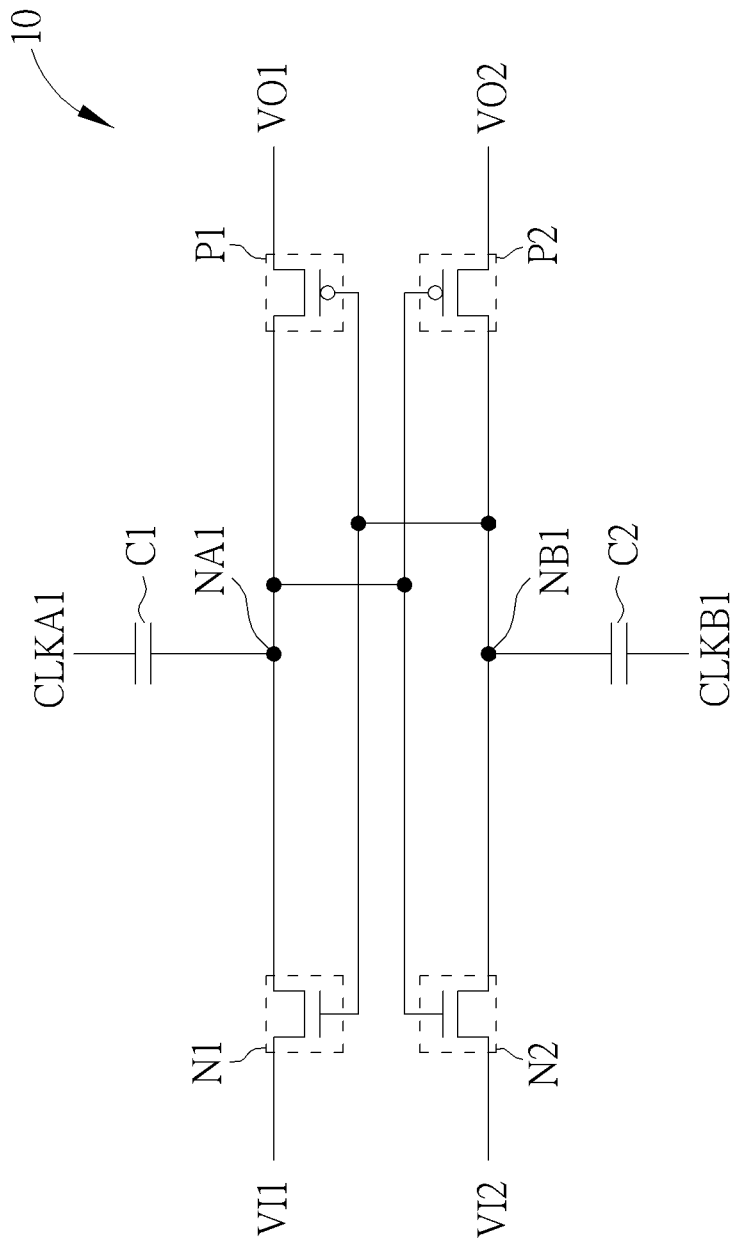
FIG. 1 shows a charge pump unit according to one embodiment of the present invention.

FIG. 1 shows a charge pump unit 10 according to one embodiment of the present invention. The charge pump unit 10 includes a first capacitor C1, a second capacitor C2, a first N-type metal oxide semiconductor (NMOS) transistor N1, a first P-type metal oxide semiconductor (PMOS) transistor P1, a second NMOS transistor N2, and a second PMOS transistor P2.

The first capacitor C1 has a first terminal and a second terminal NA1. The first terminal of the first capacitor C1 is for receiving a first clock signal CLKA1. The second capacitor C2 has a first terminal and a second terminal NB1. The first terminal of the second capacitor C2 is for receiving a second clock signal CLKB1. In some embodiments of the present invention, the first capacitor C1 can be composed of a metal oxide semiconductor transistor. For example, the first terminal of the first capacitor C1 can be the source, the drain and the body of the metal oxide semiconductor transistor while the second terminal NA1 of the first capacitor C1 can be the gate of the metal oxide semiconductor transistor. Similarly, the second capacitor C2 can also be composed of a metal oxide semiconductor transistor.

The first NMOS transistor N1 has a first terminal, a second terminal and a control terminal. The first terminal of the first NMOS transistor N1 is for receiving a first input voltage VI1, the second terminal of the first NMOS transistor N1 is coupled to the second terminal NA1 of the first capacitor C1, and the control terminal of the first NMOS transistor N1 is coupled to the second terminal NB1 of the second capacitor C2. The first PMOS transistor P1 has a first terminal, a second terminal and a control terminal. The first terminal of the first PMOS transistor P1 is coupled to the second terminal of the first NMOS transistor N1, the second terminal of the first PMOS transistor P1 is for outputting a first output voltage VO1, and the control terminal of the first PMOS transistor P1 is coupled to the control terminal of the first NMOS transistor N1.

The second NMOS transistor N2 has a first terminal, a second terminal and a control terminal. The first terminal of the second NMOS transistor N2 is for receiving a second input voltage VI2, the second terminal of the second NMOS transistor N2 is coupled to the second terminal NB1 of the second capacitor C2, and the control terminal of the second NMOS transistor N2 is coupled to the second terminal NA1 of the first capacitor C1. The second PMOS transistor P2 has a first terminal, a second terminal and a control terminal. The first terminal of the second PMOS transistor P2 is coupled to the second terminal of the second NMOS transistor N2, the second terminal of the second PMOS transistor P2 is for outputting a second output voltage VO2, and the control terminal of the second PMOS transistor P2 is coupled to the control terminal of the second NMOS transistor N2. The first input voltage VI1 and the second input voltage VI2 can be substantially equal to a high voltage VDD.

Figure 2:
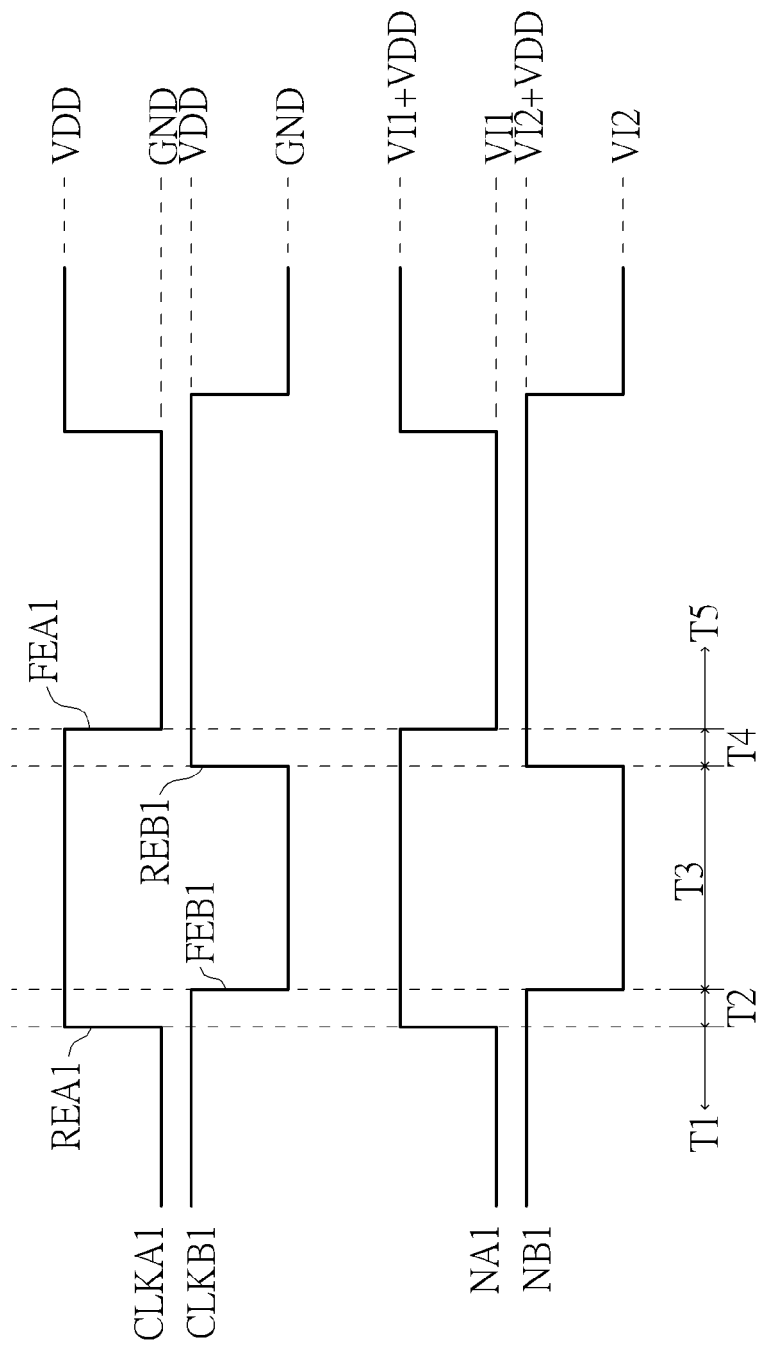
FIG. 2 shows the operational timing of the charge pump unit in FIG. 1 according to one embodiment of the present invention.

In order to prevent the charge pump unit 10 from generating reverse currents, the first clock signal CLKA1 and the second clock signal CLKB1 are designed to turn on the NMOS transistors and PMOS transistors in a predetermined order. FIG. 2 shows the operational timing diagram of the charge pump unit 10 according to one embodiment of the present invention.

In FIG. 2, the first clock signal CLKA1 and the second clock signal CLKB1 transit at different time points.

Furthermore, a rising edge REA1 of the first clock signal CLKA1 leads a respective falling edge FEB1 of the second clock signal CLKB1. During a first time period T1 before the rising edge REA1 of the first clock signal CLKA1, the first clock signal CLKA1 is at the low voltage GND and the second clock signal CLKB1 is at the high voltage VDD. In this case, the voltage level of the second terminal NB1 of the second capacitor C2 remains around VI2+VDD due to the previous operations. Therefore, the first NMOS transistor N1 is turned on, and the first PMOS transistor P1 is turned off. Thus, the voltage level of the second terminal NA1 of the first capacitor C1 is kept the same as the first input voltage VI1. The second NMOS transistor N2 is turned off, and the second PMOS transistor P2 is turned on. In the first time period T1, the second output voltage VO2 outputted from the second PMOS transistor P2 is around VI2+VDD.

During a second time period T2 between the rising edge REA1 of the first clock signal CLKA1 and the falling edge FEB1 of the second clock signal CLKB1, the first clock signal CLKA1 is at the high voltage VDD and the second clock signal CLKB1 is at the high voltage VDD. The voltage level of the second terminal NA1 of the capacitor C1 is coupled to VI1+VDD instantly. Since the voltage level of the second terminal NB1 of the second capacitor C2 remains around VI2+VDD, the first NMOS transistor N1 and the second NMOS transistor N2 are both turned on. The first PMOS transistor P1 and the second PMOS transistor P2 are both turned off. Thus, reverse currents generated at the outputs of the charge pump unit 10 due to the second clock CLKB1 changing to low voltage GND before the first clock CLKA1 changing to high voltage VDD in prior art can be avoided. In addition, although the first capacitor C1 may be discharged through the first NMOS transistor N1 unwantedly, the voltage drops are rather small and will not cause any significant effect because the second time period T2 is rather short and the voltage of the second terminal of the first capacitor C1 is not affecting the output voltage directly due to the turning off of the first PMOS transistor P1.

During a third time period T3 after the falling edge FEB1 of the second clock signal CLKB1, the first clock signal CLKA1 is at the high voltage VDD and the second clock signal CLKB1 is at the low voltage GND. The voltage level of the second terminal NB1 of the second capacitor C2 is coupled to VI2 while the voltage level of the second terminal NA1 of the first capacitor C1 remains at VI1+VDD. Therefore, the first NMOS transistor N1 is turned off and the first PMOS transistor P1 is turned on. Consequently, first output voltage VO1 outputted from the second terminal of the first PMOS P1 is about VI1+VDD. Also, the second NMOS transistor N2 is turned on and the second PMOS transistor P2 is turned off so that the voltage level of the second terminal NB1 of the second capacitor C2 is kept at VI2 by the second NMOS transistor N2.

Similarly, the second PMOS transistor P2 can be used to output the second output voltage VO2, which is greater than the second input voltage VI2. In this case, to prevent reverse currents, a rising edge REB1 of the second clock signal CLKB1 leads a respective falling edge FEA1 of the first clock signal CLKA1.

During a fourth time period T4 between the rising edge REB1 of the second clock signal CLKB1 and the falling edge FEA1 of the first clock signal CLKA1, the first clock signal CLKA1 is at the high voltage VDD and the second clock signal CLKB1 is at the high voltage VDD. In this case, the voltage level of the second terminal NB1 of the capacitor C2 is coupled to VI2+VDD instantly. Since the voltage level of the second terminal NA1 of the first capacitor C1 remains around VI1+VDD due to the operations in the time period T3, the second NMOS transistor N2 and the first NMOS transistor N1 are turned on. Also, the first PMOS transistor P1 and the second PMOS transistor P2 are turned off. Thus, reverse currents generated at the outputs of the charge pump unit 10 due to the first clock CLKA1 changing to low voltage GND before the second clock CLKB1 changing to high voltage VDD in prior art can be avoided.

During a fifth time period T5 after the falling edge FEA1 of the first clock signal CLKA1, the first clock signal CLKA1 is at the low voltage GND and the second clock signal CLKB1 is at the high voltage VDD. Therefore, the voltage level of the second terminal NA1 of the first capacitor C1 is coupled to VI1 while the voltage level of the second terminal NB1 of the second capacitor C2 remains at VI2+VDD. Therefore, the second NMOS transistor N2 is turned off and the second PMOS transistor P2 is turned on. Consequently, the second terminal of the second PMOS P2 can output the second output voltage VO2, which is about VI2+VDD. Also, the first NMOS transistor N1 is turned on and the first PMOS transistor P1 is turned off so that the voltage level of the second terminal NA1 of the first capacitor C1 is kept at VI1.

Therefore, the charge pump unit 10 can generate voltages greater than its input voltages while no reverse current is generated.

Figure 3:
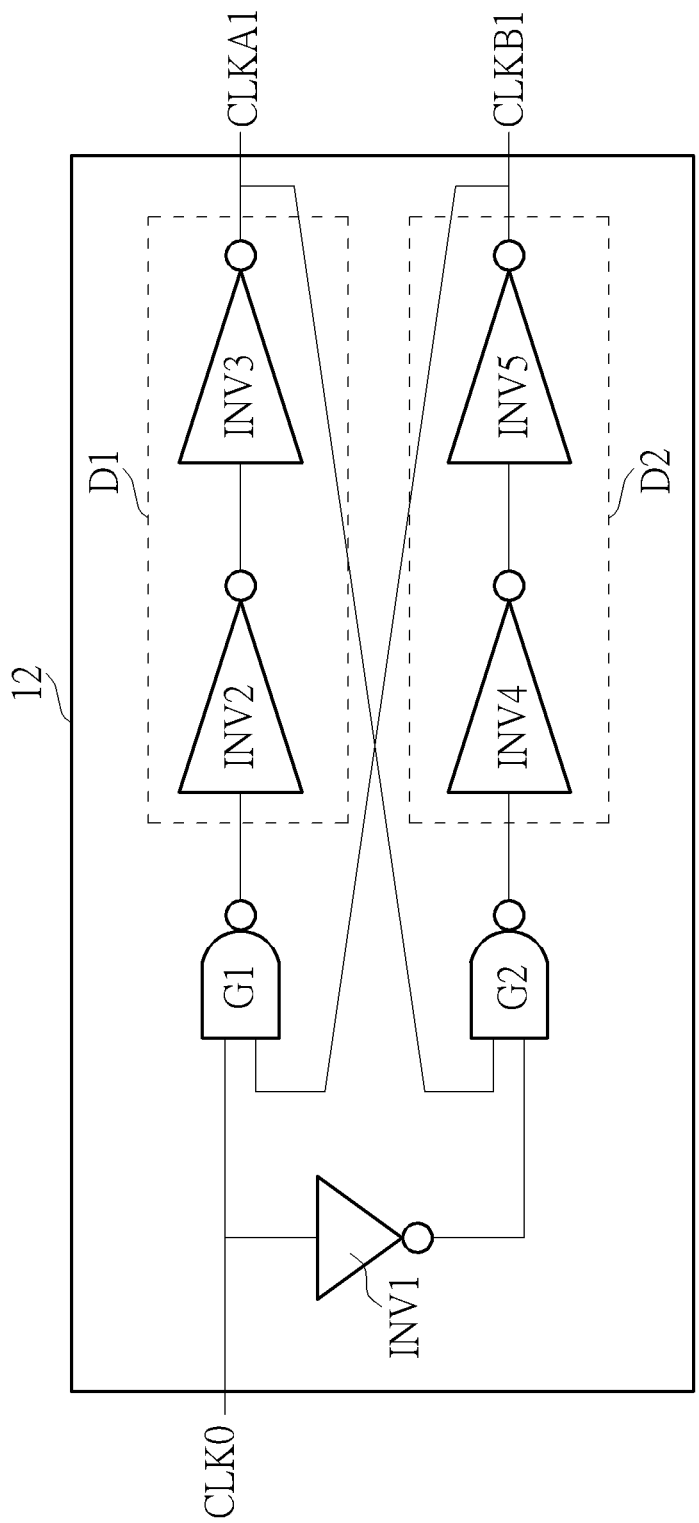
FIG. 3 shows clock generator of the charge pump unit in FIG. 1 according to one embodiment of the present invention.

FIG. 3 shows a clock generator 12 according to one embodiment of the present invention. The clock generator 12 can generate the first clock signal CLKA1 and the second clock signal CLKB1 according to a reference clock CLK0. The clock generator 12 includes a first inverter INV1, a first NAND gate G1, a first delay circuit D1, a second NAND gate G2, and a second delay circuit D2.

The first inverter INV1 has an input terminal and an output terminal. The input terminal of the first inverter INV1 is for receiving a reference clock signal CLK0. The first NAND gate G1 has a first input terminal, a second input terminal, and an output terminal. The first input terminal of the first NAND gate G1 is for receiving the reference clock signal CLK0. The first delay circuit D1 has an input terminal and an output terminal. The input terminal of the first delay circuit D1 is coupled to the output terminal of the first NAND gate G1, and an output terminal of the first delay circuit D1 is for outputting the first clock signal CLKA1. The second NAND gate G2 has a first input terminal, a second input terminal, and an output terminal. The first input terminal of the second NAND gate G2 is coupled to the output terminal of the first inverter INV1, the second input terminal of the second NAND gate G2 is coupled to the output terminal of the first delay circuit D1. The second delay circuit D2 has an input terminal and an output terminal. The input terminal of the second delay circuit D2 is coupled to the output terminal of the second NAND gate G2, and the output terminal of the second delay circuit D2 is coupled to the second input terminal of the first NAND gate G1 and is for outputting the second clock signal CLKB1.

In some embodiments of the present invention, the first delay circuit D1 and the second delay circuit D2 can output signals by delaying their input signals. In the embodiment of FIG. 3, the function of delaying input signals can be done by using inverters. In FIG. 3, the first delay circuit D1 includes a second inverter INV2 and a third inverter INV3. The second inverter has an input terminal and an output terminal. The input terminal of the second inverter INV2 is coupled to the input terminal of the first delay circuit D1. The third inverter INV3 has an input terminal and an output terminal. The input terminal of the third inverter INV3 is coupled to the output terminal of the second inverter INV2, and the output terminal of the third inverter INV3 is coupled to the output terminal of the first delay circuit D1.

Similarly, the second delay circuit D2 includes a fourth inverter INV4 and a fifth inverter INV5. The fourth inverter INV4 has an input terminal and an output terminal. The input terminal of the fourth inverter INV4 is coupled to input terminal of the second delay circuit D2. The fifth inverter INV5 has an input terminal and an output terminal. The input terminal of the fifth inverter INV5 is coupled to the output terminal of the fourth inverter INV4, and the output terminal of the fifth inverter INV5 is coupled to the output terminal of the second delay circuit D2.

Figure 4:
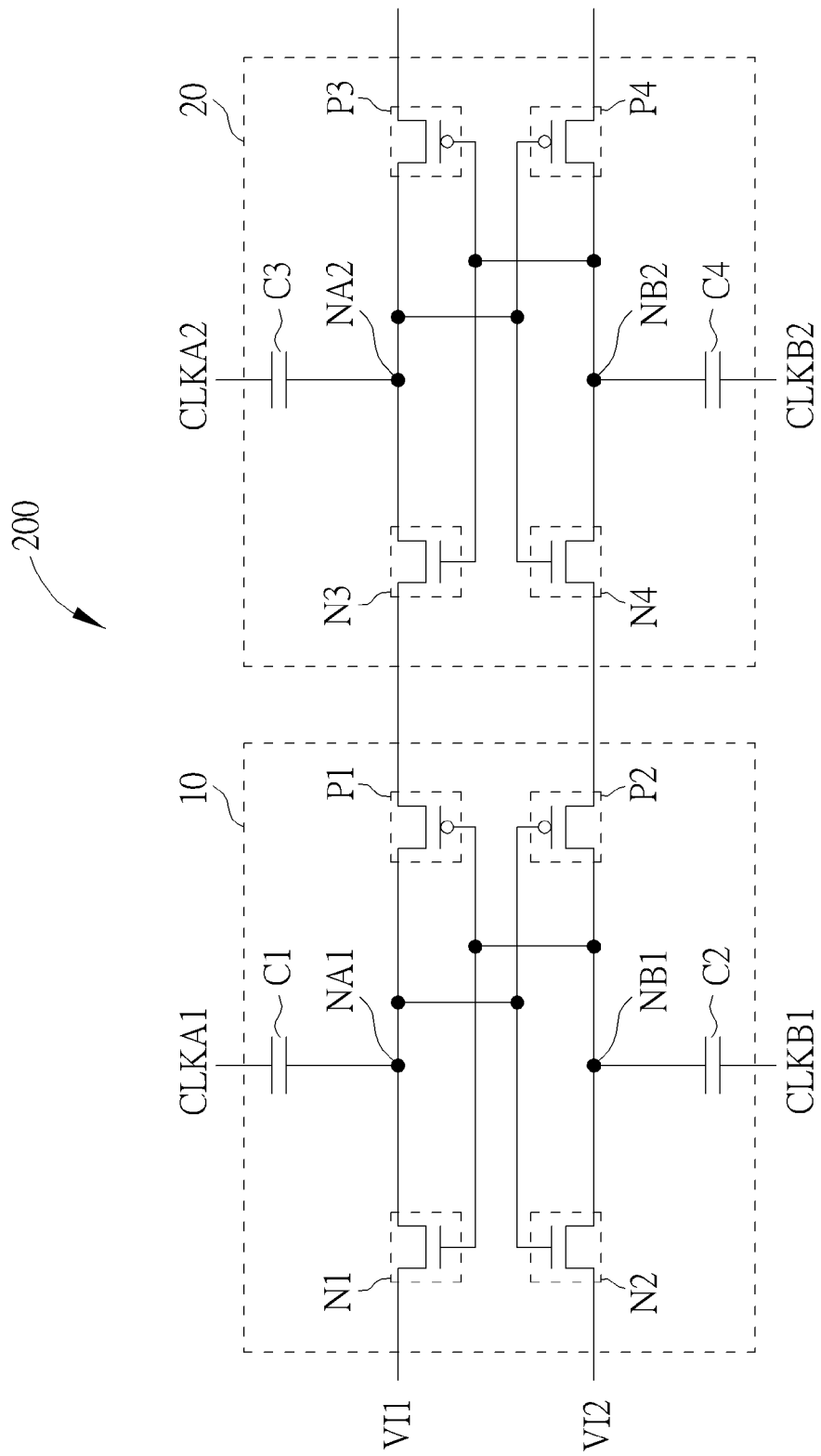
FIG. 4 shows a charge pump circuit according to one embodiment of the present invention.

In some embodiments of the present invention, a plurality of charge pump units can be combined together for generating even higher output voltages. FIG. 4 shows a charge pump circuit 200 according to one embodiment of the present invention. The charge pump circuit 200 includes the first charge pump unit 10 and a second charge pump unit 20.

The second charge pump unit 20 has a similar structure as the first charge pump unit 10. The second charge pump unit 20 includes a third capacitor C3, a fourth capacitor C4, a third NMOS transistor N3, a third PMOS transistor P3, a fourth NMOS transistor N4, and a fourth PMOS transistor P4.

The third capacitor C3 has a first terminal and a second terminal NA2. The first terminal of the third capacitor C3 is for receiving a third clock signal CLKA2. The fourth capacitor C4 has a first terminal and a second terminal NB2. The first terminal of the fourth capacitor C4 is for receiving a fourth clock signal CLKB2.

The third NMOS transistor N3 has a first terminal, a second terminal and a control terminal. The first terminal of the third NMOS transistor N3 is coupled to the second terminal of the first PMOS transistor P1, the second terminal of the third NMOS transistor N3 is coupled to the second terminal NA2 of the third capacitor C3, and the control terminal of the third NMOS transistor N3 is coupled to the second terminal NB2 of the fourth capacitor C4. The third PMOS transistor P3 has a first terminal, a second terminal and a control terminal. The first terminal of the third PMOS transistor P3 is coupled to the second terminal of the third NMOS transistor N3, and the control terminal of the third PMOS transistor P3 is coupled to the control terminal of the third NMOS transistor N3.

The fourth NMOS transistor N4 has a first terminal, a second terminal and a control terminal. The first terminal of the fourth NMOS transistor N4 is coupled to the second terminal of the second PMOS transistor P2, the second terminal of the fourth NMOS transistor N4 is coupled to the second terminal NB2 of the fourth capacitor C4, and the control terminal of the fourth NMOS transistor N4 is coupled to the second terminal NA2 of the third capacitor C3. The fourth PMOS transistor P4 has a first terminal, a second terminal and a control terminal. The first terminal of the fourth PMOS transistor P4 is coupled to the second terminal of the fourth NMOS transistor N4, and the control terminal of the fourth PMOS transistor P4 is coupled to the control terminal of the fourth NMOS transistor N4.

Figure 5:
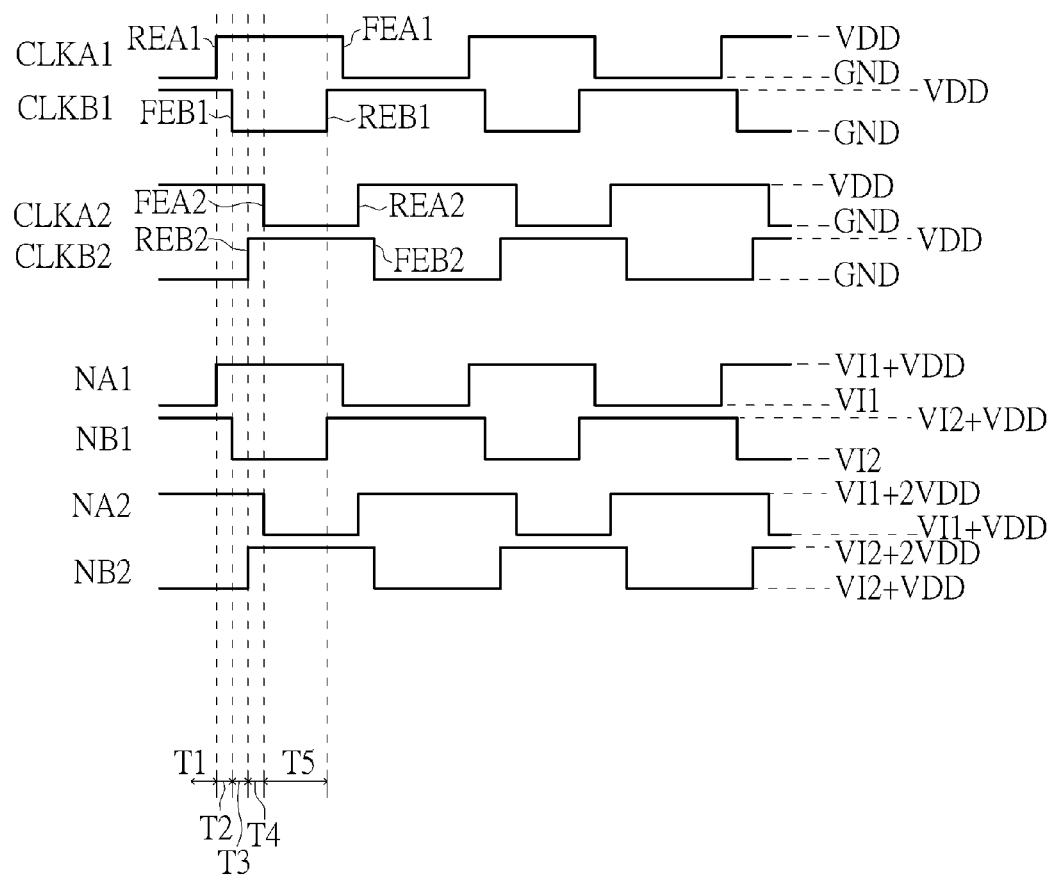
FIG. 5 shows the operational timing of the charge pump circuit in FIG. 4 according to one embodiment of the present invention.

FIG. 5 shows the operational timing diagram of charge pump circuit 200 according to one embodiment of the present invention.

In FIG. 5, the first clock signal CLKA1, the second clock signal CLKB1, the third clock signal CLKA2, and the fourth clock signal CLKB2 transit at different time points.

Generally, in the first time period T1 in FIG. 5, the second terminal NA1 of the first capacitor C1 can be charged to the first input voltage VI1 through the first NMOS transistor N1, the second terminal NA2 of the third capacitor C3 can output the high voltage of VI1+2VDD through the third PMOS transistor P3, and the second terminal NB2 of the fourth capacitor C4 can be charged to VI2+VDD from the second terminal NB1 of the second capacitor C2 through the second PMOS transistor P2 and the fourth NMOS transistor N4. Also, in the fifth time period T5 in FIG. 5, the second terminal NB1 of the second capacitor C2 can be charged to the second input voltage VI2 through the second NMOS transistor N2, the second terminal NB2 of the fourth capacitor C4 can output the high voltage of VI2+2VDD through the fourth PMOS transistor P4, and the second terminal NA2 of the third capacitor C3 can be charged to VI1+VDD from the second terminal NA1 of the first capacitor C1 through the first PMOS transistor P1 and the third NMOS transistor N3.

However, to prevent the charge pump circuit 200 from generating reverse current, transitions of different clock signals CLKA1, CLKA2, CLKB1, and CLKB2 are separated. That is, a falling edge FEB1 of the second clock signal CLKB1 lags a respective rising edge REA1 of the first clock signal CLKA1 and leads a respective rising edge REB2 of the fourth clock signal CLKB2. Also, the rising edge REB2 of the fourth clock signal CLKB2 leads a respective falling edge FEA2 of the third clock signal CLKA2. Consequently, there are three more time periods T2, T3 and T4 between the first time period T1 and the fifth time period T5.

In FIG. 5, during the first time period T1 before the rising edge REA1 of the first clock signal CLKA1, the first clock signal CLKA1 is at a low voltage GND, the second clock signal CLKB1 is at the high voltage VDD, the third clock signal CLKA2 is at the high voltage VDD, and the fourth clock signal CLKB2 is at the low voltage GND. In this case, the voltage level of the second terminal NB1 of the second capacitor C2 remains around VI2+VDD and the voltage level of the second terminal NA2 of the third capacitor C3 remains around VI1+2VDD due to the previous operations. Therefore, the first NMOS transistor N1 is turned on, and the first PMOS transistor P1 is turned off. Thus, the voltage level of the second terminal NA1 of the first capacitor C1 is kept same as the first input voltage VI1, which turns off the second NMOS transistor N2 and turns on the second PMOS transistor P2. Also, the third NMOS transistor N3 and fourth PMOS transistor P4 are turned off. The fourth NMOS transistor N4 and the third PMOS transistor P3 are turned on. Consequently, the voltage of the second terminal NB2 of the fourth capacitor C4 is at the same voltage as the voltage of the second terminal NB1 of the second capacitor C2, that is, VI2+VDD. Furthermore, the third PMOS transistor P3 can output the voltage of the second terminal NA2 of the third capacitor, which is at VI1+2VDD.

During the second time period T2 between the rising edge REA1 of the first clock signal CLKA1 and the falling edge FEB1 of the second clock signal CLKB1, the first clock signal CLKA1 is at the high voltage VDD, the second clock signal CLKB1 is at the high voltage VDD, the third clock signal CLKA2 is at the high voltage VDD, and the fourth clock signal CLKB2 is at the low voltage GND. The third NMOS transistor N3 and fourth PMOS transistor P4 remain turned off. The fourth NMOS transistor N4 and the third PMOS transistor P3 remain turned on. The voltage level of the second terminal NA1 of the capacitor C1 is coupled to VI1+VDD instantly. Since the voltage level of the second terminal NB1 of the second capacitor C2 remains around VI2+VDD, the first NMOS transistor N1 and the second NMOS transistor N2 are both turned on. Also, the first PMOS transistor P1 and the second PMOS transistor P2 are turned off. Therefore, no reverse current will be generated between the fourth capacitor C4 and the second capacitor C2 or between the first capacitor C1 and the third capacitor C3. Although the first capacitor C1 may be discharged through the first NMOS transistor N1 unwantedly, the voltage drops are rather small and will not cause any significant effect because the second time period T2 is rather short and the voltage of the second terminal of the first capacitor C1 is not affecting the output voltage directly due to the turned-off the first PMOS transistor P1. In addition, this voltage drop may only happen to the first charge pump unit 10, and can be prevented by the clock signals in the following charge pump units.

During the third time period T3 between the falling edge FEB1 of the second clock signal CLKB1 and the rising edge REB2 of the fourth clock signal CLKB2, the first clock signal CLKA1 is at the high voltage VDD, the second clock signal CLKB1 is at the low voltage GND, the third clock signal CLKA2 is at the high voltage VDD, and the fourth clock signal CLKB2 is at the low voltage GND. Therefore, the voltage level of the second terminal NB1 of the second capacitor C2 is coupled to VI2 while the voltage level of the second terminal NA1 of the first capacitor C1 remains at VDD+VI1. The first NMOS transistor N1 is turned off and the first PMOS transistor P1 is turned on. In this case, the second terminal of the first PMOS P1 can output the voltage of the second terminal NA1 of the first capacitor, that is, VI1+VDD. Also, although the voltage level of the second terminal NB2 of the fourth capacitor C4 may be higher than the voltage level of the second terminal NB1 of the second capacitor C2 due to previous operations, no reverse current will be generated since the second PMOS transistor P2 remains turned off.

During the fourth time period T4 between the rising edge REB2 of the fourth clock signal CLKB2 and the falling edge FEA2 of the third clock signal CLKA2, the first clock signal CLKA1 is at the high voltage VDD, the second clock signal CLKB1 is at the low voltage GND, the third clock signal CLKA2 is at the high voltage VDD, and the fourth clock signal CLKB2 is at the high voltage VDD. The voltage level of the second terminal NB2 of the fourth capacitor C4 is coupled to VI2+2VDD instantly. Since the voltage level of the second terminal NA2 of the third capacitor C3 remains around VI1+2VDD, the third NMOS transistor N3 and the fourth NMOS transistor N4 are turned on. The third PMOS transistor P3 and the fourth PMOS transistor P4 are turned off. Although the second terminal of the third capacitor C3 may be discharged through the first PMOS transistor P1 and the third NMOS transistor N3, the voltage level of the second terminal of the third capacitor C3 will not be outputted due to the turned off third PMOS transistor P3. Also the voltage level of the second terminal of the third capacitor C3 will finally be adjusted to VI1+VDD in the next time period T5 so the voltage drop of the third capacitor C3 can be ignored. Meanwhile, since the second PMOS transistor P2 remains turned off, no reverse current will be generated between the second capacitor C2 and the fourth capacitor C4.

During the fifth time period T5 after the falling edge FEA2 of the third clock signal CLKA2, the first clock signal CLKA1 is at the high voltage VDD, the second clock signal CLKB1 is at the low voltage GND, the third clock signal CLKA2 is at the low voltage GND, and the fourth clock signal CLKB2 is at the high voltage VDD. Therefore, the voltage level of the second terminal NA2 of the third capacitor C3 is coupled to around VI1+VDD while the voltage level of the second terminal NB2 of the fourth capacitor C4 remains at VI2+2VDD. The third NMOS transistor N3 is turned on and the third PMOS transistor P3 is turned off. The turned-on third NMOS transistor N3 and the turned-on first PMOS transistor P1 can further maintain the voltage level of the second terminal NA2 of the third capacitor C3 to be same as the voltage level of the second terminal NA1 of the first capacitor C1, that is VI1+VDD. Also, the fourth PMOS P4 is turned on and the fourth NMOS N4 is turned off. Therefore, the second terminal of the fourth PMOS P4 can output a voltage higher than the second input voltage VI2, that is, VI2+2VDD.

In some embodiments of the present invention, the periods of the clock signals CLKA1, CLKB1, CLKA2, and CLKB2 can be 10 ns to 20 ns, and the time periods T2, T3, and T4 between falling edges and rising edges can be shorter than 1 ns but long enough to turn on or turn off the transistors.

According to the aforesaid clock signals CLKA1, CLKB1, CLKA2, and CLKB2, the charge pump circuit 200 can output voltages higher than its input voltages and reduce reverse currents. Therefore, the unnecessary power consumption of the charge pump circuit 200 can be saved.

In addition, the second charge pump unit 20 can also output a high voltage from the third PMOS P3. In this case, to prevent the reverse current, the similar timing can be applied. That is, in FIG. 5, a falling edge FEA1 of the first clock signal CLKA1 lags a respective rising edge REB1 of the second clock signal CLKB1 and leads a respective rising edge REA2 of the third clock signal CLKA2. The rising edge REA2 of the third clock signal CLKA2 leads a respective falling edge FEB2 of the fourth clock signal CLKB2. Consequently, the charge pump circuit 200 can output the voltage VI1+2VDD and VI2+2VDD from the third PMOS P3 and the fourth PMOS transistor P4 respectively and alternately.

In some embodiments, the charge pump circuit 200 may include clock generators to produce the desired clock signals. In FIG. 5, the fourth clock signal CLKB2 can be produced by delaying the first clock signal CLKA1 by the time periods T2 and T3. That is, the fourth clock signal CLKB2 can be generated by delaying the first clock signal CLKA1 with a simple delay circuit. Similarly, the third clock signal CLKA2 can also be generated by delaying the second clock signal CLKB1 properly in some embodiments of the present invention. However, by using simple delay circuits to generate all the clock signals, the duty cycles of the clock signals may be different from each other. Furthermore, the difference of duty cycles of the clock signals may increase when the number of clock signals increases.

Figure 6:
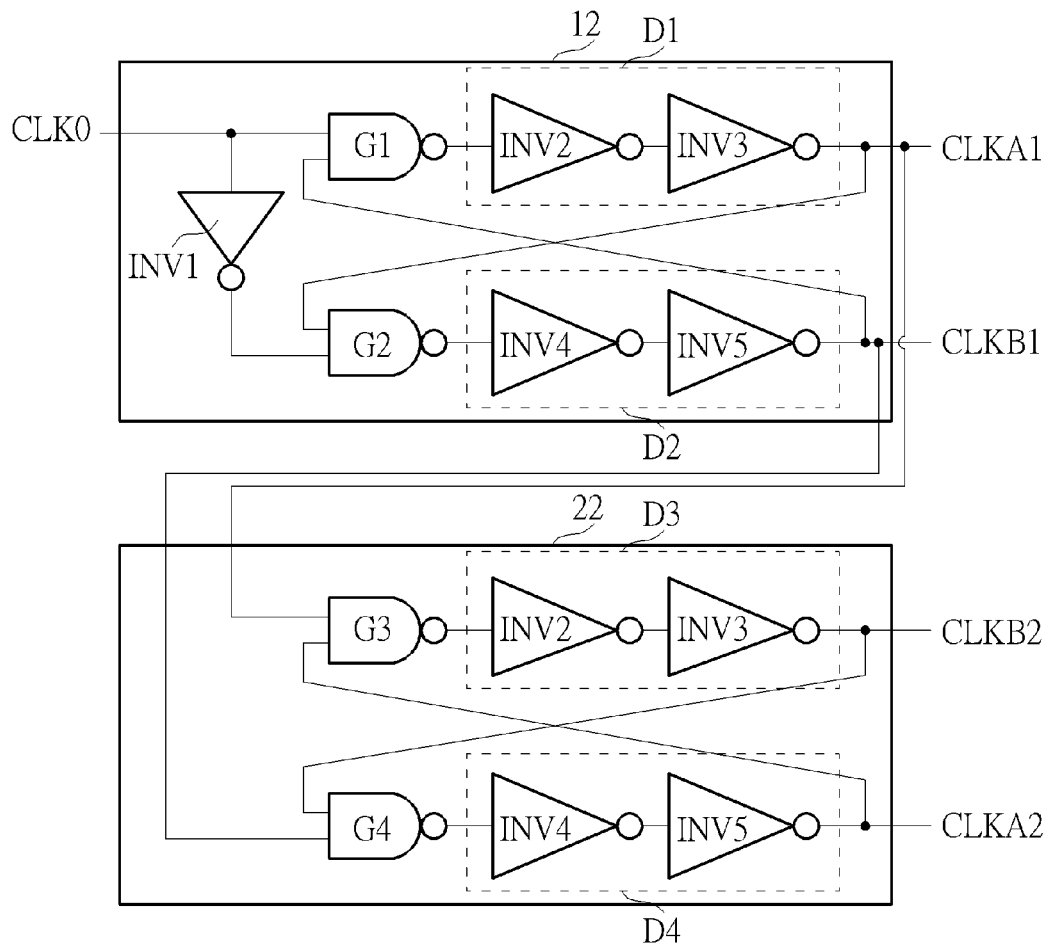
FIG. 6 shows clock generators of the charge pump circuit in FIG. 4 according to one embodiment of the present invention.

FIG. 6 shows the clock generator 12 and a clock generator 22 according to one embodiment of the present invention. The clock generator 12 can generate the first clock signal CLKA1 and the second clock signal CLKB1 according to a reference clock CLK0, and the clock generator 22 can generate the third clock signal CLKA2 and the fourth clock signal CLKB2 according to the first clock signal CLKA1 and the second clock signal CLKB1. The clock generator 22 includes a third NAND gate G3, a third delay circuit D3, a fourth NAND gate G4, and a fourth delay circuit D4. According to the clock generators 12 and 22, the difference of duty cycles of clock signals can be avoided.

The third NAND gate G3 has a first input terminal, a second input terminal, and an output terminal. The first input terminal of the third NAND gate G3 is coupled to the output terminal of the first delay circuit D1 for receiving the first clock signal CLKA1. The third delay circuit D3 has an input terminal and an output terminal. The input terminal of the third delay circuit D3 is coupled to the output terminal of the third NAND gate G3, and an output terminal is for outputting the fourth clock signal CLKB2.

The fourth NAND gate G4 has a first input terminal, a second input terminal, and an output terminal. The first input terminal of the fourth NAND gate G4 is coupled to the output terminal of the second delay circuit D2 for receiving the second clock signal CLKB1, the second input terminal of the fourth NAND gate G4 is coupled to the output terminal of the third delay circuit D3. The fourth delay circuit D4 has an input terminal and an output terminal. The input terminal of the fourth delay circuit D4 is coupled to the output terminal of the fourth NAND gate G4, and the output terminal of the fourth delay circuit D4 is coupled to the second input terminal of the third NAND gate G3 and is for outputting the third clock signal CLKA2.

Figure 7:
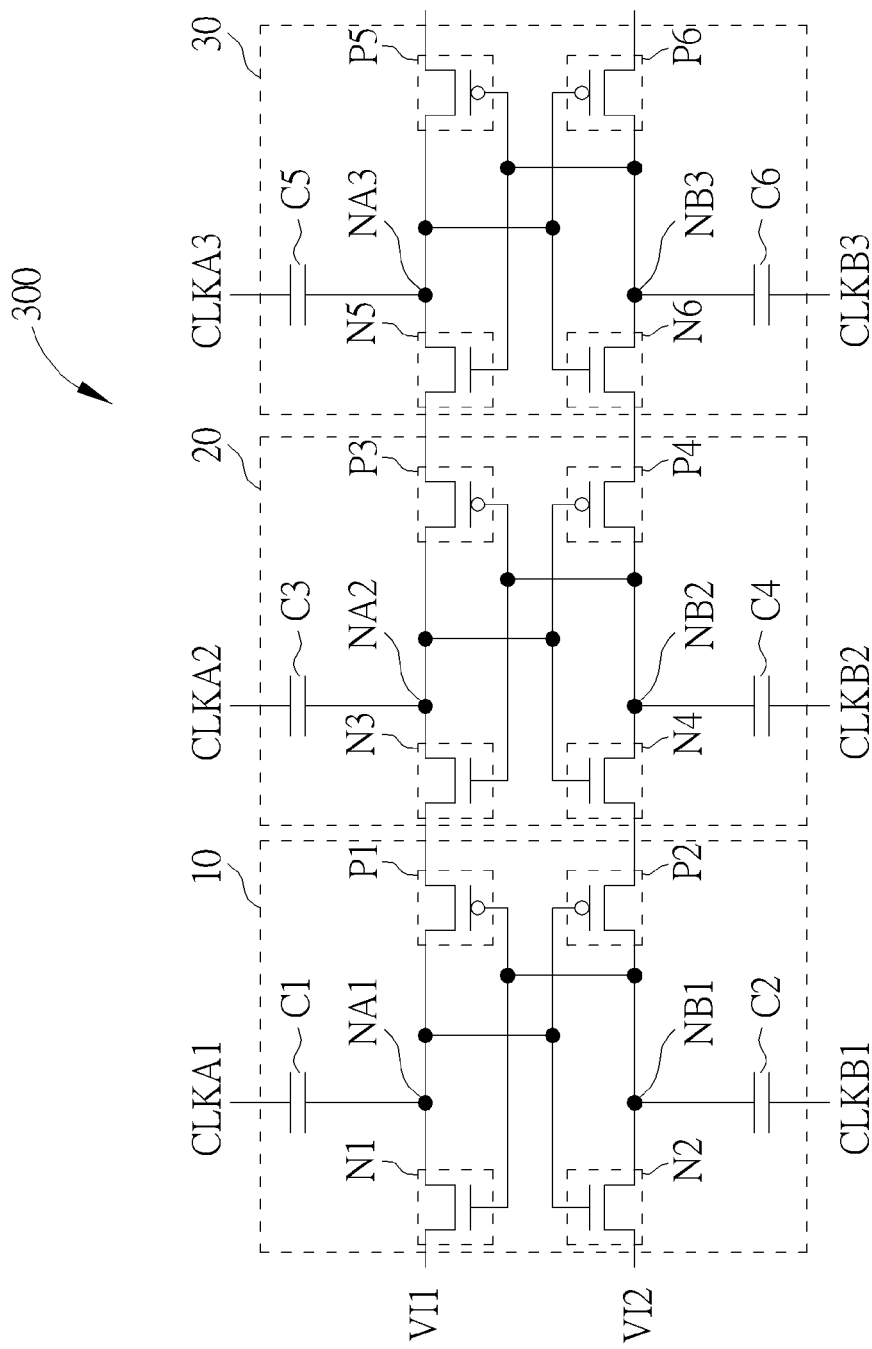
FIG. 7 shows a charge pump circuit according to another embodiment of the present invention.

In some embodiments of the present invention, the charge pump circuit 200 may include more charge pump units so that the output voltages of the charge pump circuit can be pumped to even higher voltage levels. FIG. 7 shows a charge pump circuit 300 according to one embodiment of the present invention. The charge pump circuit 300 includes the first charge pump unit 10, the second charge pump unit 20, and a third charge pump unit 30.

The third charge pump unit 30 has a similar structure as the first charge pump unit 10. The third charge pump unit 30 includes a fifth capacitor C5, a sixth capacitor C6, a fifth NMOS transistor N5, a fifth PMOS transistor P5, a sixth NMOS transistor N6, and a sixth PMOS transistor P6.

The fifth capacitor C5 has a first terminal and a second terminal NA3. The first terminal of the fifth capacitor C5 is for receiving a fifth clock signal CLKA3. The sixth capacitor C6 has a first terminal and a second terminal NB3. The first terminal of the sixth capacitor C6 is for receiving a sixth clock signal CLKB3.

The fifth NMOS transistor N5 has a first terminal, a second terminal and a control terminal. The first terminal of the fifth NMOS transistor N5 is coupled to the second terminal of the third PMOS transistor P3, the second terminal of the fifth NMOS transistor N5 is coupled to the second terminal NA3 of the fifth capacitor C5, and the control terminal of the fifth NMOS transistor N5 is coupled to the second terminal NB3 of the sixth capacitor C6. The fifth PMOS transistor P5 has a first terminal, a second terminal and a control terminal. The first terminal of the fifth PMOS transistor P5 is coupled to the second terminal of the fifth NMOS transistor N5, and the control terminal of the fifth PMOS transistor P5 is coupled to the control terminal of the fifth NMOS transistor N5.

The sixth NMOS transistor N6 has a first terminal, a second terminal and a control terminal. The first terminal of the sixth NMOS transistor N6 is coupled to the second terminal of the fourth PMOS transistor P4, the second terminal of the sixth NMOS transistor N6 is coupled to the second terminal NB3 of the sixth capacitor C6, and the control terminal of the sixth NMOS transistor N6 is coupled to the second terminal NA3 of the fifth capacitor C5. The sixth PMOS transistor P6 has a first terminal, a second terminal and a control terminal. The first terminal of the sixth PMOS transistor P6 is coupled to the second terminal of the sixth NMOS transistor N6, and the control terminal of the sixth PMOS transistor P6 is coupled to the control terminal of the sixth NMOS transistor N6.

Figure 8:
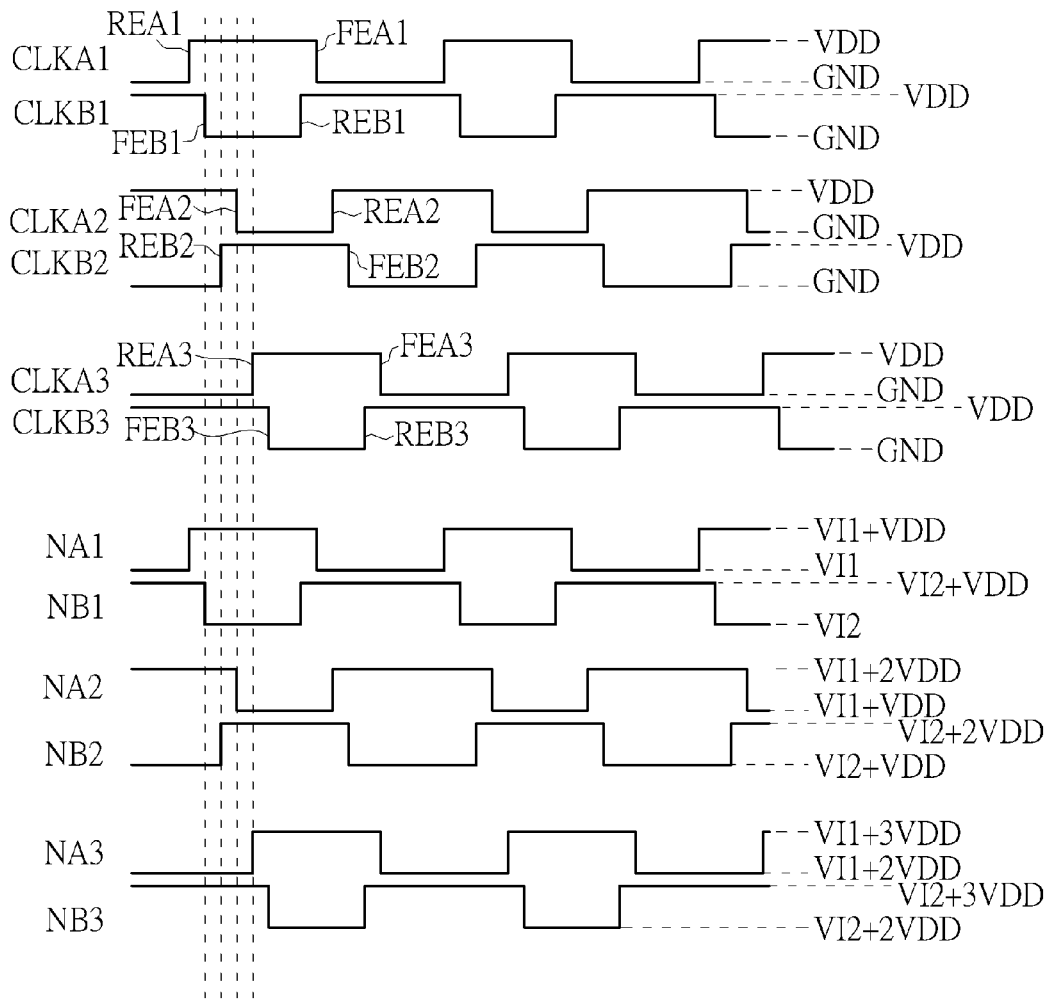
FIG. 8 shows the operational timing of the charge pump circuit in FIG. 7 according to one embodiment of the present invention.

The third charge pump unit 30 and the second charge pump unit 20 have the same operational principles. Namely, the third charge pump unit 30 can receive voltages (ex., VI1+2VDD and VI2+2VDD) from the second charge pump unit 20 through the fifth NMOS transistor N5 and the sixth NMOS transistor N6, and outputs higher voltages (ex., VI1+3VDD and VI2+3VDD). FIG. 8 shows the operational timing diagram of charge pump circuit according to one embodiment of the present invention.

In FIG. 8, the first clock signal CLKA1, the second clock signal CLKB1, the third clock signal CLKA2, the fourth clock signal CLKB2, the fifth clock signal CLKA3, and the sixth clock signal CLKB3 transit at different time points.

To prevent the charge pump circuit 300 from generating reverse current, a falling edge FEB1 of the second clock signal CLKB1 lags a respective rising edge REA1 of the first clock signal CLKA1 and leads a respective rising edge REB2 of the fourth clock signal CLKB2. Also, the rising edge REB2 of the fourth clock signal CLKB2 leads a respective falling edge FEA2 of the third clock signal CLKA2. Furthermore, a rising edge REA3 of the fifth clock signal CLKA3 lags the respective falling edge FEA2 of the third clock signal CLKA2 and leads a respective falling edge FEB3 of the sixth clock signal CLKB3.

Also, in FIG. 8, the falling edge FEA1 of the first clock signal CLKA1 lags a respective rising edge REB1 of the second clock signal CLKB1 and leads a respective rising edge REA3 of the third clock signal CLKA2. The rising edge REA2 of the third clock signal CLKA2 leads a respective falling edge FEB2 of the fourth clock signal CLKB2. A rising edge REB3 of the sixth clock signal CLKB3 lags the respective falling edge FEB2 of the fourth clock signal CLKB2 and leads a respective falling edge FEA3 of the fifth clock signal CLKA3.

Consequently, the charge pump circuit 300 can output the voltages VI1+3VDD and VI2+3VDD from the fifth PMOS P5 and the sixth PMOS transistor P6 respectively and alternately. Also, the charge pump circuit 300 can reduce reverse currents according to the well-arranged clock signals.

In FIG. 8, the fourth clock signal CLKB2 can be produced by delaying the first clock signal CLKA1 by the time periods T2 and T3. That is, the fourth clock signal CLKB2 can be generated by delaying the first clock signal CLKA1 with a simple delay circuit. Similarly, the third clock signal CLKA2 can be generated by delaying the second clock signal CLKB1 properly in some embodiments of the present invention. Also, the fifth clock signal CLKA3 and the sixth clock signal CLKB3 can be generated by delaying the first clock signal CLKA1, the second clock signal CLKB1, or the third clock signal CLKA2, and/or the fourth clock signal CLKB2 properly in some embodiments of the present invention. However, by using simple delay circuits to generate all the clock signals, the duty cycles of the clock signals may be different from each other. Furthermore, the difference of duty cycles of the clock signals may increase when the number of clock signals increases.

Figure 9:
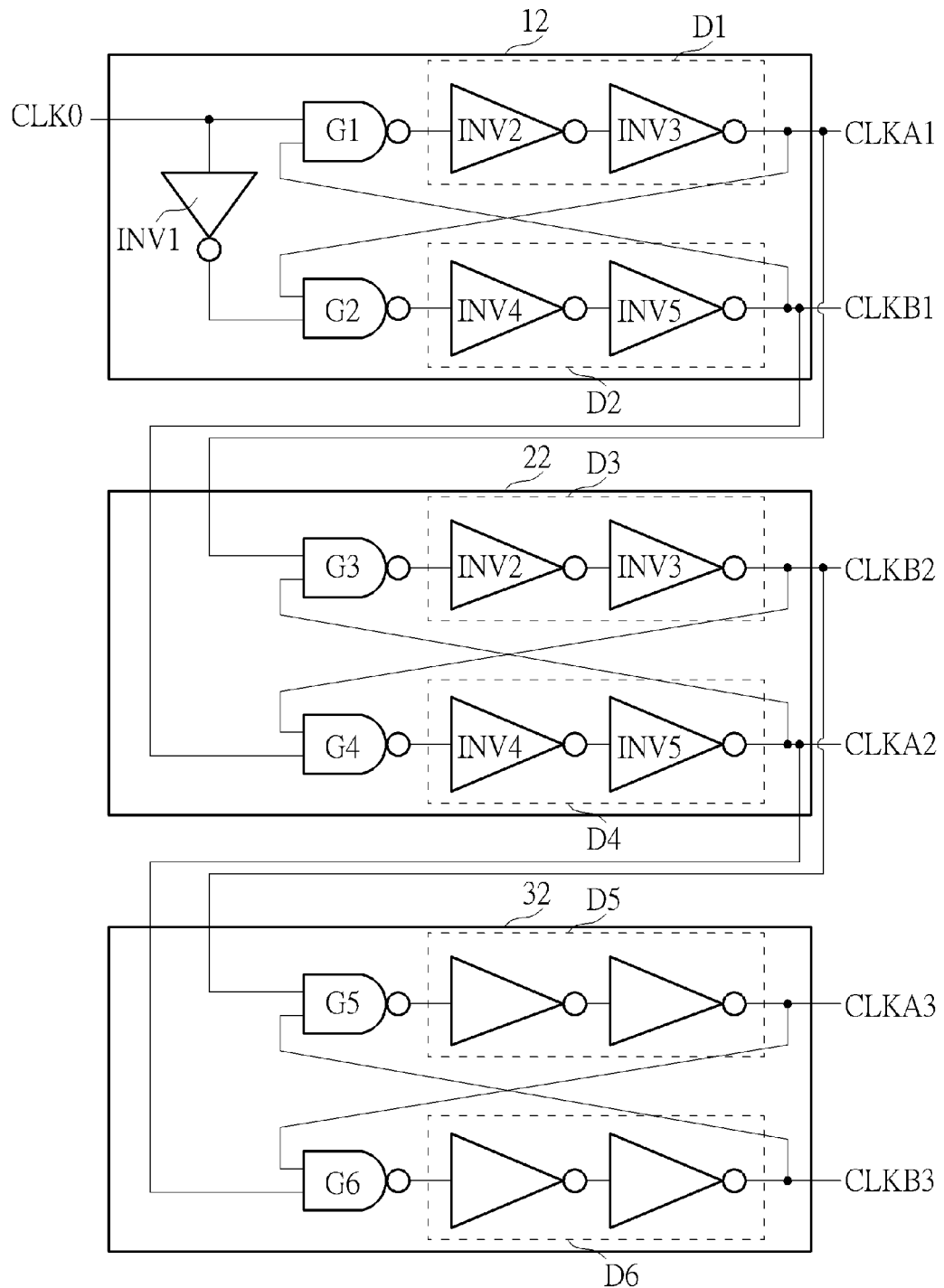
FIG. 9 shows clock generators of the charge pump circuit in FIG. 7 according to one embodiment of the present invention.

FIG. 9 further shows the clock generator 12, the clock generator 22, and a clock generator 32 according to one embodiment of the present invention. The clock generator 12 can generate the first clock signal CLKA1 and the second clock signal CLKB1 according to a reference clock CLK0, the clock generator 22 can generate the third clock signal CLKA2 and the fourth clock signal CLKB2 according to the first clock signal CLKA1 and the second clock signal CLKB1, and the clock generator 32 can generate the fifth clock signal CLKA3 and the sixth clock signal CLKB3 according to the third clock signal CLKA2 and the fourth clock signal CLKB2. The clock generator 32 and the clock generator 22 have same structure. That is, the clock generator 32 includes a fifth NAND gate G5, a fifth delay circuit D5, a sixth NAND gate G6, and a sixth delay circuit D6. By using the clock generators 12, 22 and 32, the difference of duty cycles of the clock signals can be avoided.

The fifth NAND gate G5 has a first input terminal, a second input terminal, and an output terminal. The first input terminal of the fifth NAND gate G5 is coupled to the output terminal of the third delay circuit D3 for receiving the fourth clock signal CLKB2. The fifth delay circuit D5 has an input terminal and an output terminal. The input terminal of the fifth delay circuit D5 is coupled to the output terminal of the fifth NAND gate G5, and an output terminal is for outputting the fifth clock signal CLKA3.

The sixth NAND gate G6 has a first input terminal, a second input terminal, and an output terminal. The first input terminal of the sixth NAND gate G6 is coupled to the output terminal of the fourth delay circuit D4 for receiving the third clock signal CLKA2, the second input terminal of the sixth NAND gate G6 is coupled to the output terminal of the fifth delay circuit D5. The sixth delay circuit D6 has an input terminal and an output terminal. The input terminal of the sixth delay circuit D6 is coupled to the output terminal of the sixth NAND gate G6, and the output terminal of the sixth delay circuit D6 is coupled to the second input terminal of the fifth NAND gate G5 and is for outputting the sixth clock signal CLKB3.

With the clock generator circuits 12, 22, and 32, the first to sixth clock signals CLKA1 to CLKB3 can be generated according to the reference clock signal CLK0. In some embodiments of the present invention, the charge pump circuits may include a plurality number of charge pump units for generating desired high voltages. With the increasing numbers of the charge pump units, the corresponding clock signals can easily generated by including a corresponding number of clock generators of similar structures. Therefore, the flexible design of the charge pump circuit can fit the system requirements even more easily.

In summary, according to the embodiments of the present invention, the charge pump units and the charge pump circuits can generate high voltages for system requirements and reduce the reverse currents according to the well-arranged clock signals. Therefore, the unnecessary power consumption can be saved. Also, the flexible design of the charge pump circuits can fit the system requirements even more easily.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charge pump unit, comprising:
a first capacitor having a first terminal configured to receive a first clock signal, and a second terminal;
a second capacitor having a first terminal configured to receive a second clock signal, and a second terminal;
a first N-type metal oxide semiconductor transistor having a first terminal configured to receive a first input voltage, a second terminal coupled to the second terminal of the first capacitor, and a control terminal coupled to the second terminal of the second capacitor;
a first P-type metal oxide semiconductor transistor having a first terminal coupled to the second terminal of the first N-type metal oxide semiconductor transistor, a second terminal configured to output a first output voltage, and a control terminal coupled to the control terminal of the first N-type metal oxide semiconductor transistor;
a second N-type metal oxide semiconductor transistor having a first terminal configured to receive a second input voltage, a second terminal coupled to the second terminal of the second capacitor, and a control terminal coupled to the second terminal of the first capacitor; and
a second P-type metal oxide semiconductor transistor having a first terminal coupled to the second terminal of the second N-type metal oxide semiconductor transistor, a second terminal configured to output a second output voltage, and a control terminal coupled to the control terminal of the second N-type metal oxide semiconductor transistor;
wherein:
the first clock signal and the second clock signal transit at different time points; and
a rising edge of the first clock signal leads a respective falling edge of the second clock signal.

2. The charge pump unit of claim 1, wherein a rising edge of the second clock signal leads a respective falling edge of the first clock signal.

3. The charge pump unit of claim 2, further comprising:
a clock generator comprising:
a first inverter having an input terminal configured to receive a reference clock signal, and an output terminal;
a first NAND gate having a first input terminal configured to receive the reference clock signal, a second input terminal, and an output terminal;
a first delay circuit having an input terminal coupled to the output terminal of the first NAND gate, and an output terminal configured to output the first clock signal;
a second NAND gate having a first input terminal coupled to the output terminal of the first inverter, a second input terminal coupled to the output terminal of the first delay circuit, and an output terminal; and
a second delay circuit having an input terminal coupled to the output terminal of the second NAND gate, and an output terminal coupled to the second input terminal of the first NAND gate and configured to output the second clock signal.

4. The charge pump unit of claim 3, wherein:
the first delay circuit comprises:
a second inverter having an input terminal coupled to the input terminal of the first delay circuit, and an output terminal; and
a third inverter having an input terminal coupled to the output terminal of the second inverter, and an output terminal coupled to the output terminal of the first delay circuit; and
the second delay circuit comprises:
a fourth inverter having an input terminal coupled to input terminal of the second delay circuit, and an output terminal; and
a fifth inverter having an input terminal coupled to the output terminal of the fourth inverter, and an output terminal coupled to the output terminal of the second delay circuit.

5. The charge pump unit of claim 1, wherein the first capacitor is composed of a metal oxide semiconductor transistor, and the second capacitor is composed of a metal oxide semiconductor transistor.

6. A charge pump circuit, comprising:
a first charge pump unit comprising:
a first capacitor having a first terminal configured to receive a first clock signal, and a second terminal;
a second capacitor having a first terminal configured to receive a second clock signal, and a second terminal;
a first N-type metal oxide semiconductor transistor having a first terminal configured to receive a first input voltage, a second terminal coupled to the second terminal of the first capacitor, and a control terminal coupled to the second terminal of the second capacitor;
a first P-type metal oxide semiconductor transistor having a first terminal coupled to the second terminal of the first N-type metal oxide semiconductor transistor, a second terminal, and a control terminal coupled to the control terminal of the first N-type metal oxide semiconductor transistor;
a second N-type metal oxide semiconductor transistor having a first terminal configured to receive a second input voltage, a second terminal coupled to the second terminal of the second capacitor, and a control terminal coupled to the second terminal of the first capacitor; and
a second P-type metal oxide semiconductor transistor having a first terminal coupled to the second terminal of the second N-type metal oxide semiconductor transistor, a second terminal, and a control terminal coupled to the control terminal of the second N-type metal oxide semiconductor transistor; and a second charge pump unit comprising:
- a third capacitor having a first terminal configured to receive a third clock signal, and a second terminal;
- a fourth capacitor having a first terminal configured to receive a fourth clock signal, and a second terminal;
- a third N-type metal oxide semiconductor transistor having a first terminal coupled to the second terminal of the first P-type metal oxide semiconductor transistor, a second terminal coupled to the second terminal of the third capacitor, and a control terminal coupled to the second terminal of the fourth capacitor;
- a third P-type metal oxide semiconductor transistor having a first terminal coupled to the second terminal of the third N-type metal oxide semiconductor transistor, a second terminal, and a control terminal coupled to the control terminal of the third N-type metal oxide semiconductor transistor;
- a fourth N-type metal oxide semiconductor transistor having a first terminal coupled to the second terminal of the second P-type metal oxide semiconductor transistor, a second terminal coupled to the second terminal of the fourth capacitor, and a control terminal coupled to the second terminal of the third capacitor; and
- a fourth P-type metal oxide semiconductor transistor having a first terminal coupled to the second terminal of the fourth N-type metal oxide semiconductor transistor, a second terminal, and a control terminal coupled to the control terminal of the fourth N-type metal oxide semiconductor transistor;

wherein:
the first clock signal, the second clock signal, the third clock signal, and the fourth clock signal transit at different time points;
a falling edge of the second clock signal lags a respective rising edge of the first clock signal and leads a respective rising edge of the fourth clock signal; and
the rising edge of the fourth clock signal leads a respective falling edge of the third clock signal.

7. The charge pump circuit of claim 6, wherein:
a falling edge of the first clock signal lags a respective rising edge of the second clock signal and leads a respective rising edge of the third clock signal; and
the rising edge of the third clock signal leads a respective falling edge of the fourth clock signal.

8. The charge pump circuit of claim 7, further comprising:
a first clock signal generator comprising:
- a first inverter having an input terminal configured to receive a reference clock signal, and an output terminal;
- a first NAND gate having a first input terminal configured to receive the reference clock signal, a second input terminal, and an output terminal;
- a first delay circuit having an input terminal coupled to the output terminal of the first NAND gate, and an output terminal configured to output the first clock signal;
- a second NAND gate having a first input terminal coupled to the output terminal of the first inverter, a second input terminal coupled to the output terminal of the first delay circuit, and an output terminal; and
- a second delay circuit having an input terminal coupled to the output terminal of the second NAND gate, and an output terminal coupled to the second input terminal of the first NAND gate and configured to output the second clock signal; and a second clock generator comprising:
- a third NAND gate having a first input terminal coupled to the output terminal of the first delay circuit, a second input terminal, and an output terminal;
- a third delay circuit having an input terminal coupled to the output terminal of the third NAND gate, and an output terminal configured to output the fourth clock signal;
- a fourth NAND gate having a first input terminal coupled to the output terminal of the second delay circuit, a second input terminal coupled to the output terminal of the third delay circuit, and an output terminal; and
- a fourth delay circuit having an input terminal coupled to the output terminal of the fourth NAND gate, and an output terminal coupled to the second input terminal of the third NAND gate and configured to output the third clock signal.

9. The charge pump circuit of claim 6, further comprising:
a third charge pump unit comprising:
- a fifth capacitor having a first terminal configured to receive a fifth clock signal, and a second terminal;
- a sixth capacitor having a first terminal configured to receive a sixth clock signal, and a second terminal;
- a fifth N-type metal oxide semiconductor transistor having a first terminal coupled to the second terminal of the third P-type metal oxide semiconductor transistor, a second terminal coupled to the second terminal of the fifth capacitor, and a control terminal coupled to the second terminal of the sixth capacitor;
- a fifth P-type metal oxide semiconductor transistor having a first terminal coupled to the second terminal of the fifth N-type metal oxide semiconductor transistor, a second terminal, and a control terminal coupled to the control terminal of the fifth N-type metal oxide semiconductor transistor;
- a sixth N-type metal oxide semiconductor transistor having a first terminal coupled to the second terminal of the fourth P-type metal oxide semiconductor, a second terminal coupled to the second terminal of the sixth capacitor, and a control terminal coupled to the second terminal of the fifth capacitor; and
- a sixth P-type metal oxide semiconductor transistor having a first terminal coupled to the second terminal of the sixth N-type metal oxide semiconductor transistor, a second terminal, and a control terminal coupled to the control terminal of the sixth N-type metal oxide semiconductor transistor;

wherein:
the first clock signal, the second clock signal, the third clock signal, the fourth clock signal, the fifth clock signal, and the sixth clock signal transit at different time points; and
a rising edge of the fifth clock signal lags the respective falling edge of the third clock signal and leads a respective falling edge of the sixth clock signal.

10. The charge pump circuit of claim 9, wherein:
a falling edge of the first clock signal lags a respective rising edge of the second clock signal and leads a respective rising edge of the third clock signal;
the rising edge of the third clock signal leads a respective falling edge of the fourth clock signal; and
a rising edge of the sixth clock signal lags the respective falling edge of the fourth clock signal and leads a respective falling edge of the fifth clock signal.

11. The charge pump circuit of claim 10, further comprising:
 a first clock generator comprising:
  a first inverter having an input terminal configured to receive a reference clock signal, and an output terminal;
  a first NAND gate having a first input terminal configured to receive the reference clock signal, a second input terminal, and an output terminal;
  a first delay circuit having an input terminal coupled to the output terminal of the first NAND gate, and an output terminal configured to output the first clock signal;
  a second NAND gate having a first input terminal coupled to the output terminal of the first inverter, a second input terminal coupled to the output terminal of the first delay circuit, and an output terminal; and
  a second delay circuit having an input terminal coupled to the output terminal of the second NAND gate, and an output terminal coupled to the second input terminal of the first NAND gate and configured to output the second clock signal;
 a second clock generator comprising:
  a third NAND gate having a first input terminal coupled to the output terminal of the first delay circuit, a second input terminal, and an output terminal;
  a third delay circuit having an input terminal coupled to the output terminal of the third NAND gate, and an output terminal configured to output the fourth clock signal;
  a fourth NAND gate having a first input terminal coupled to the output terminal of the second delay circuit, a second input terminal coupled to the output terminal of the third delay circuit, and an output terminal; and
  a fourth delay circuit having an input terminal coupled to the output terminal of the fourth NAND gate, and an output terminal coupled to the second input terminal of the third NAND gate and configured to output the third clock signal; and
 a third clock generator comprising:
  a fifth NAND gate having a first input terminal coupled to the output terminal of the third delay circuit, a second input terminal, and an output terminal;
  a fifth delay circuit having an input terminal coupled to the output terminal of the fifth NAND gate, and an output terminal configured to output the fifth clock signal;
  a sixth NAND gate having a first input terminal coupled to the output terminal of the fourth delay circuit, a second input terminal coupled to the output terminal of the fifth delay circuit, and an output terminal; and
  a sixth delay circuit having an input terminal coupled to the output terminal of the sixth NAND gate, and an output terminal coupled to the second input terminal of the fifth NAND gate and configured to output the sixth clock signal.

\* \* \* \* \*